Feb. 3, 1959    J. J. HENDLEY ET AL    2,872,143
HOSE RACK
Filed May 25, 1956

INVENTORS
JOEL J. HENDLEY
& ALLEN A. ALEXANDER
BY
McMorrow, Berman & Davidson
ATTORNEYS

2,872,143
HOSE RACK
Joel J. Hendley and Allen A. Alexander, St. Louis, Mo.

Application May 25, 1956, Serial No. 587,268

3 Claims. (Cl. 248—81)

This invention relates to improvements in garden hose racks of the type involving means for holding a hose nozzle in sprinking positions and means for supporting the hose in reeled condition.

The primary object of the invention is to provide a more practical and convenient device of this kind which is simple in structure, is composed of a minimum number of simple parts, and in which the hose nozzle holding means is readily adjustable into different angular positions.

A further object of the invention is to provide in a hose support rack wherein the hose may be pivotally adjusted about a horizontal axis so that the trajectory of the water discharged by the hose can be adjusted.

A still further object of the invention is to provide a novel hose support rack of the character indicated which is readily and economically manufactured, easily used, and highly practical, serviceable and acceptable for the purpose intended.

Other objects and advantages of the invention reside in the details of construction and operation as more fully hereinafter described and claimed, reference being had to the accompanying drawing forming a part hereof, wherein like numerals refer to like parts throughout, and in which:

Figure 1:
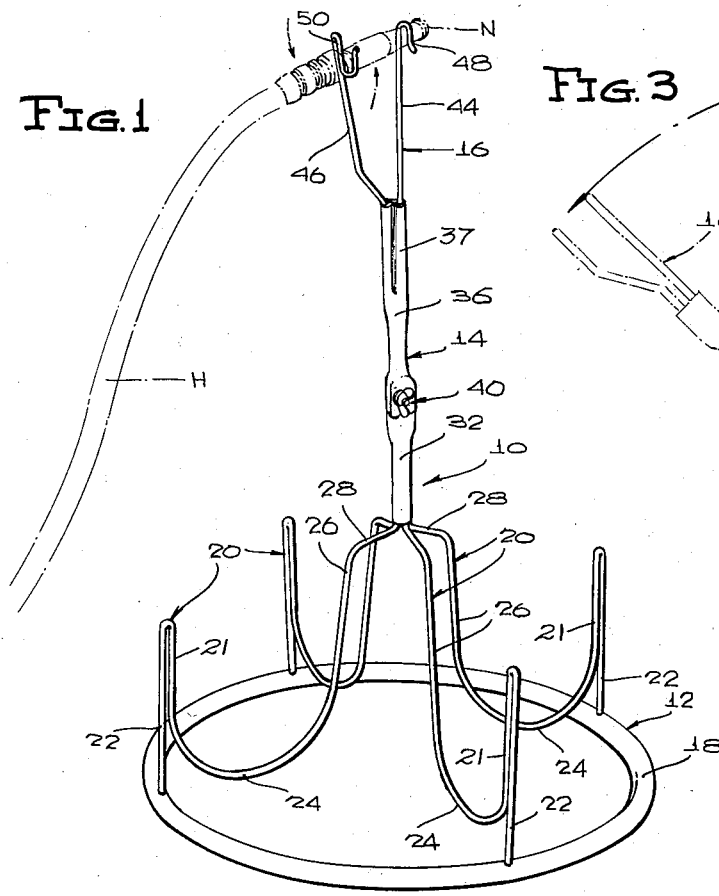
Figure 1 is a perspective view of a hose rack, in accordance with the present invention, showing in phantom lines a hose supported thereon in sprinking position.

Referring to the drawing in detail, the illustrated rack, generally designated 10, comprises a base 12, a support post 14, and a hose gripping element 16, made of any suitable materials.

The base 12 comprises a ring 18 which has secured on its upper surface thereof a plurality of generally U-shaped reel arms 20. The U-shaped reel arms 20 include vertical portions 22 suitably secured, as by welding, at their lower ends on the upper surface of the ring 18, said vertical portions 22 merging at their upper ends into the upper ends of outer legs 21 of U-shapes which have bight portions 24 and inner legs 26. The upper ends of the inner legs 26 are bent radially inward at 28 and terminate in vertical terminals 30 which are in side-by-side relation to each other.

The device further comprises a support post 14 having a lower tubular section 32 which is crimped at its lower end about the terminals 30 of the U-shaped support elements, said section 32 terminating at its upper end in a flat ear 34 having a transverse aperture extending therethrough. The support post 14 includes a tubular upper section 36 which has on its lower end a flat ear 38, and extending through the ears 34 and 38 in a bolt 40 having a wing nut 41 thereon, whereby the upper section 36 of the post can be angularly adjusted about a horizontal pivot axis, as clearly shown in Figure 3.

It will be noted that the U-shaped support elements 20 are disposed in radially extending relationship to the support post 14 and combine to define an upwardly opening reel upon which a flexible hose H may be readily coiled for storage purposes, or for the purpose of disposing excess hose thereabout while the nozzle N of the hose is disposed in the gripping element 16, as shown in Figure 1.

Figure 3:
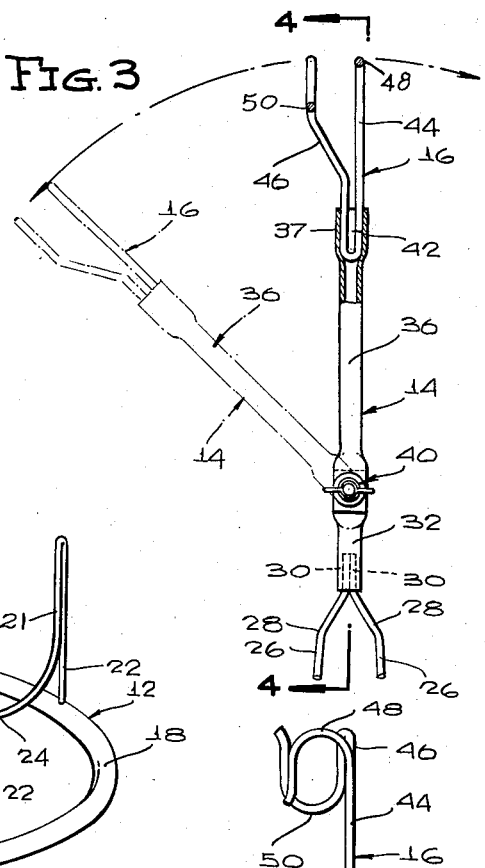
Figure 3 is a fragmentary elevational view of the upper part of the rack, with portions broken away and in section, showing in phantom lines an adjusted position of the support post.
Figure 2:
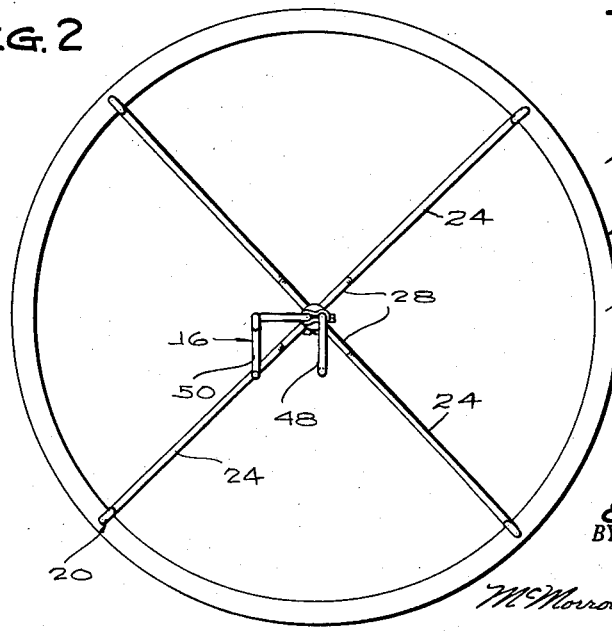
Figure 2 is a top plan view of Figure 1, the hose being removed.
Figure 4:
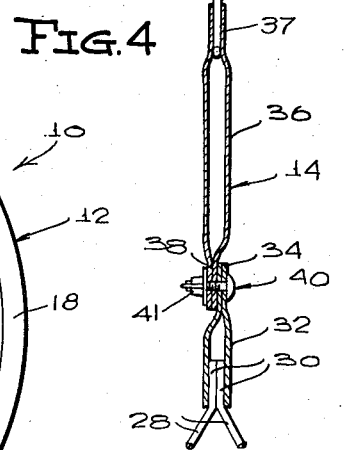
Figure 4 is a fragmentary vertical transverse sectional view taken substantially on line 4—4 of Figure 3.

At its upper end the upper post section 36 of the post 14 terminates in a flattened tubular portion 37 receiving therein the bight portion 42 connecting the lower ends of two upwardly extending laterally spaced divergent arms 44 and 46 (see Figure 3). The arm 44 terminates at its upper end in a downwardly opening hook 48, and the arm 46 terminates at its upper end in an upwardly opening hook 50 (see Figures 1 and 4). The conventional hose nozzle N is longitudinally disposed through the hooks 50 and 48 with the hook 50 supportably engaged under the nozzle, and the hook 48 retainably engaging over the nozzle. The weight of the hose H causes the nozzle N to rotate upwardly about the hook 50 as shown by the dotted arrows in Figure 1, into engagement with the hook 48, so that the nozzle is retained in a horizontal position. The angular relation of the nozzle relative to the horizontal can be readily adjusted by loosening the bolt 40, tilting the upper post section 36 to the desired angle, and retightening the bolt. The rack may be advantageously utilized when washing a car, for example, it being noted that the nozzle N can be readily removed from the hooks 48 and 50, when desired, for washing the wheels of a car.

The foregoing is considered as illustrative only of the principles of the invention. Further, since numerous modifications and changes will readily occur to those skilled in the art, it is not desired to limit the invention to the exact construction and operation shown and described, and accordingly any modifications and equivalents may be resorted to, which fall within the scope of the appended claims.

What is claimed is:

1. In a device of the character described, a base comprising a ring, a plurality of radial hose reel arms having on the outer ends vertical portions secured to the ring, said reel arms having inner ends having vertical terminals thereon and also having intermediate U-shaped hose receiving portions, a post having a lower end secured to said terminals and rising above said reel arms, and a hose nozzle gripping element on said post above said reel arms.

2. A device of the character described comprising a base consisting of a ring, a plurality of radial hose reel arms having inner and outer ends, means receiving the reel arms together at their inner ends at the center of said ring, said arms being circumferentially spaced from each other around said ring, said reel arms having intermediate U-shaped hose receiving portions, and vertical portions on the outer ends of the reel arms, said vertical portions having lower ends secured to the ring.

3. A device according to claim 2, wherein said means consists of a hose holding post having a lower end secured to and rising from the inner ends of the reel arms.

References Cited in the file of this patent

UNITED STATES PATENTS

| 331,222 | Ayres | Nov. 24, 1885 |
| 448,028 | Hall | Mar. 10, 1891 |
| 471,156 | Tinsley | Mar. 22, 1892 |
| 961,234 | Hoover | June 14, 1910 |
| 1,653,103 | Keys | Dec. 20, 1927 |
| 2,523,658 | Haupt | Sept. 16, 1950 |
| 2,621,878 | Kruger | Dec. 6, 1952 |
| 2,694,600 | Richey | Nov. 16, 1954 |
| 2,725,208 | Bova | Nov. 29, 1955 |
| 2,747,823 | Swenholt | May 29, 1956 |